United States Patent
Smith (10) Patent No.: US 12,194,781 B2
(45) Date of Patent: Jan. 14, 2025

(54) TIRE TREAD WITH REDUCED ROLLING RESISTANCE

(71) Applicant: PACCAR Inc, Bellevue, WA (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 260 days.

(21) Appl. No.: 17/485,029

(22) Filed: Sep. 24, 2021

(65) Prior Publication Data

US 2022/0153063 A1  May 19, 2022

Related U.S. Application Data

(63) Continuation of application No. 15/809,574, filed on Nov. 10, 2017, now Pat. No. 11,167,595.

(51) Int. Cl.
| | |
|---|---|
| *B60C 11/14* | (2006.01) |
| *B60C 1/00* | (2006.01) |
| *B60C 11/00* | (2006.01) |
| *B60C 11/03* | (2006.01) |
| *B60C 11/16* | (2006.01) |
| *B60C 11/18* | (2006.01) |
| B60C 11/12 | (2006.01) |

(52) U.S. Cl.
CPC ........ *B60C 11/0041* (2013.01); *B60C 1/0016* (2013.01); *B60C 11/0008* (2013.01); *B60C 11/0058* (2013.01); *B60C 11/0306* (2013.01); *B60C 11/14* (2013.01); *B60C 11/16* (2013.01); *B60C 11/18* (2013.01); *B60C 2011/0016* (2013.01); *B60C 2011/0341* (2013.01); *B60C 2011/1209* (2013.01)

(58) Field of Classification Search
CPC ........................ B60C 11/14; B60C 11/0306
See application file for complete search history.

(56) References Cited

U.S. PATENT DOCUMENTS

| | | | |
|---|---|---|---|
| 3,658,108 | A | 4/1972 | Marzocchi et al. |
| 3,759,306 | A | 9/1973 | Greiner et al. |
| 5,372,171 | A | 12/1994 | Miyazaki et al. |
| 6,260,593 | B1 | 7/2001 | Spragg et al. |
| 6,463,973 | B1 | 10/2002 | Tsumori |
| 6,715,522 | B1 * | 4/2004 | Wada ...................... B60C 11/11 152/902 |
| 7,066,226 | B1 | 6/2006 | Fiore |
| 7,549,452 | B2 | 6/2009 | Ikeda |
| 8,028,731 | B2 | 10/2011 | Boiocchi et al. |
| 8,919,404 | B2 | 12/2014 | Schweitzer et al. |
| 9,027,615 | B2 | 5/2015 | Dermience et al. |
| 9,283,817 | B2 | 3/2016 | Sandstrom et al. |
| 9,487,892 | B2 | 11/2016 | Abad |
| 2003/0062108 | A1 | 4/2003 | Bernstorf et al. |

(Continued)

FOREIGN PATENT DOCUMENTS

| | | |
|---|---|---|
| JP | 2008-055974 A | 3/2008 |
| WO | 2016-096404 A1 | 6/2016 |

*Primary Examiner* — S. Behrooz Ghorishi
*Assistant Examiner* — Alexander A Wang
(74) *Attorney, Agent, or Firm* — Seed IP Law Group LLP (57) ABSTRACT

A tire comprising a plurality of tread blocks. At least one tread block includes one or more piers for stiffening the tread blocks while allowing normal lateral (tangential) or circumferential strain for normal braking and motive traction. The piers can extend the entire length dimension of the tread block or portions thereof.

14 Claims, 5 Drawing Sheets

(56) References Cited

U.S. PATENT DOCUMENTS

| | | |
|---|---|---|
| 2009/0314404 A1 | 12/2009 | Rodgers et al. |
| 2012/0318424 A1 | 12/2012 | Lopitaux et al. |
| 2013/0014871 A1 | 1/2013 | Georges et al. |
| 2013/0048167 A1* | 2/2013 | De Monte ............. B60C 11/005 152/209.8 |
| 2013/0048169 A1 | 2/2013 | Erceg et al. |
| 2013/0126059 A1 | 5/2013 | Sandstrom et al. |
| 2013/0327459 A1 | 12/2013 | Rhyne et al. |
| 2013/0340907 A1 | 12/2013 | Pingenat et al. |
| 2014/0000773 A1 | 1/2014 | Volk et al. |
| 2015/0034223 A1* | 2/2015 | Kaneko .................. B60C 11/11 152/209.5 |
| 2015/0107736 A1 | 4/2015 | Hong |
| 2015/0158344 A1 | 6/2015 | Kishizoe |
| 2015/0239296 A1 | 8/2015 | Fukuda |
| 2015/0290975 A1 | 10/2015 | Custodero et al. |
| 2016/0167440 A1 | 6/2016 | Schweitzer et al. |
| 2016/0185162 A1* | 6/2016 | Kaji ................... B60C 11/1281 425/28.1 |
| 2021/0291594 A1* | 9/2021 | Kishizoe ............... B60C 19/082 |

* cited by examiner

TIRE TREAD WITH REDUCED ROLLING RESISTANCE

BACKGROUND

A vehicle's fuel economy is the result of its total resistance to movement. This includes overcoming inertia, driveline friction, road grades, tire rolling resistance and air drag. The transportation industry is continuously looking for ways to improve fuel efficiency of a vehicle by reducing rolling resistance. The disclosed subject matter aims to provide such a system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a tire is provided comprising a tread including first and second tread shoulders and a plurality of tread blocks positioned in between the first and second tread shoulders and separated by at least circumferential grooves. The tread blocks each have a first stiffness value. The tire also includes an elongate stiffening pier positioned at about the geometric center of one or more of the plurality of tread blocks and extending into the respective tread block. Each elongate stiffening pier has a second stiffness value that is greater than the first stiffness value.

In accordance with another aspect of the present disclosure, a tire is provided comprising a tread including first and second tread shoulders and a plurality of tread blocks positioned in a spaced apart manner between the first and second tread shoulders. The tread blocks each having a first stiffness value. The tie also includes a plurality of plate stiffeners each positioned laterally along a tread block, wherein the plurality of plate stiffeners each have a stiffness value that is greater than the stiffness value of the tread blocks.

In accordance with another aspect of the present disclosure, a tire is provided. The tire includes a tread including first and second tread shoulders and a plurality of tread blocks positioned in a spaced apart manner between the first and second tread shoulders. The tire also includes means for stiffening the tread blocks, wherein the tread blocks in conjunction with the said means for stiffening the tread blocks have a stiffness value that is greater than the stiffness value of the tread blocks without said means for stiffening.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of methodologies and technologies for reducing the rolling resistance of a tire on a vehicle, such as a Class 8 truck, in order to increase fuel efficiency. Conventional tire compounds are isotropic, possessing uniform properties in all directions. As will be described in more detail below, various techniques according to one or more aspects of the present disclosure vary the material properties of the tire to strategically stiffen the tread block structures such that tread compressive strain and its concomitant hysteresis loss (rolling resistance) is diminished. The inventor has discovered that by engineering an increased stiffness into the tread block in the tire's axial direction (i.e., the vector extending outwardly from the rotational center of the tire) without affecting tangential or lateral stiffness, rolling resistance can be reduced. Such modifications aim for limited effects on a number of tire characteristics such as slip resistance for braking, acceleration, and lateral stability.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Throughout the following description, terms in the tire art will be used to describe various aspects of the present application. For ease of understanding, the followings definition of terms is provided.

Apex" means an elastomeric filler located radially above the bead core and between the plies and the turnup ply.

"Annular" means formed like a ring.

"Axial" and "axially" are used herein to refer to lines or directions that intersect the axis of rotation of the tire.

"Bead" means that part of the tire comprising an annular tensile member wrapped by ply cords and shaped, with or without other reinforcement elements, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°-65° angle with respect to equatorial plane of the tire. If multiple plies are present, the ply cords run at opposite angles in alternating layers.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Equatorial plane (EP)" means the plane perpendicular to the tire's axis of rotation and passing through the center of its tread; or the plane containing the circumferential centerline of the tread.

"Inner" means toward the inside of the tire and "outer" means toward its exterior.

"Innerliner" means the layer or layers of elastomer or other material that form the inside surface of a tubeless tire and that contain the inflating fluid within the tire.

"Lateral" means a direction from sidewall to sidewall and generally parallel with the axis of rotation of the tire.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Sidewall" means that portion of a tire between the tread and the bead.

"Siping" means the process of cutting thin slits across the surface of a tread.

"Tread" means a molded rubber component which, when bonded to a tire casing, includes that portion of the tire that comes into contact with the road when the tire is normally inflated and under normal load.

Figure 1:
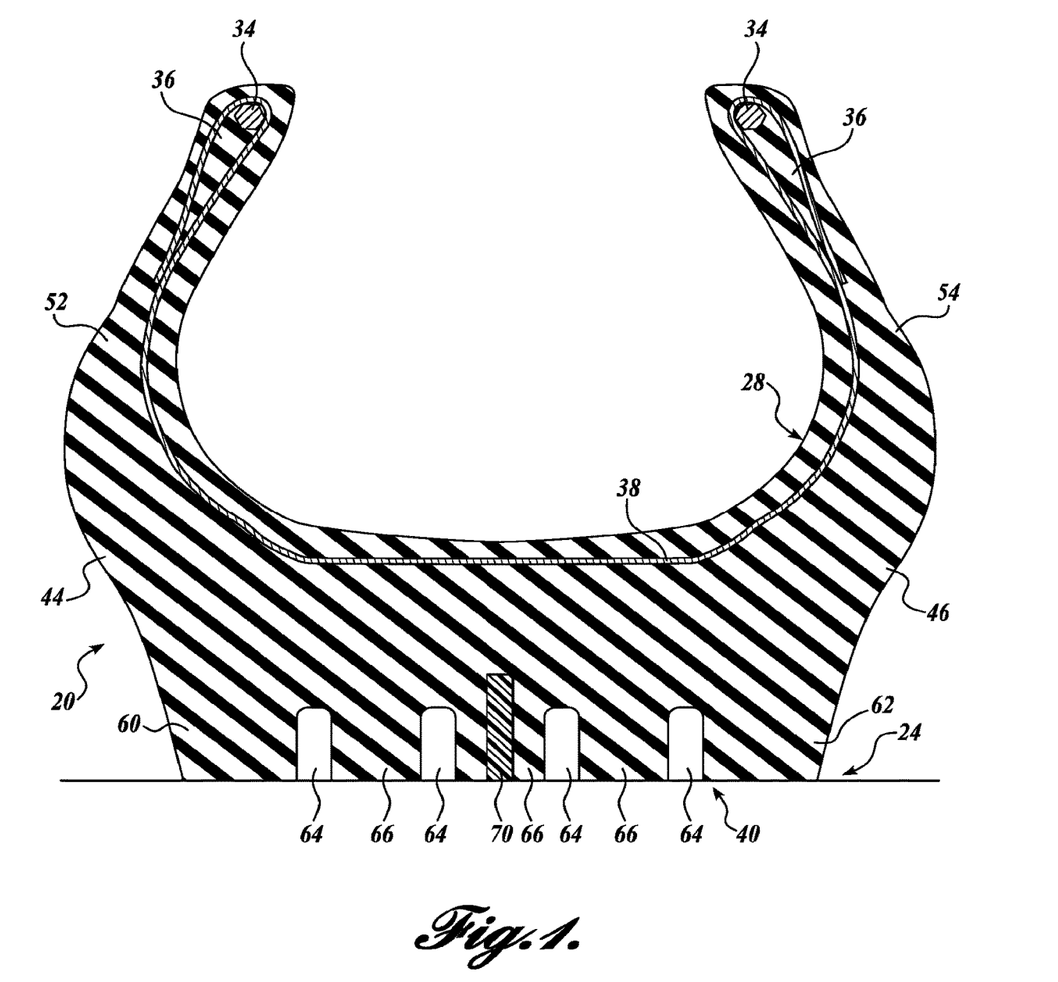
FIG. 1 is a cross section view of one representative embodiment of a tire in accordance with one or more aspects of the present disclosure.
Figure 2:
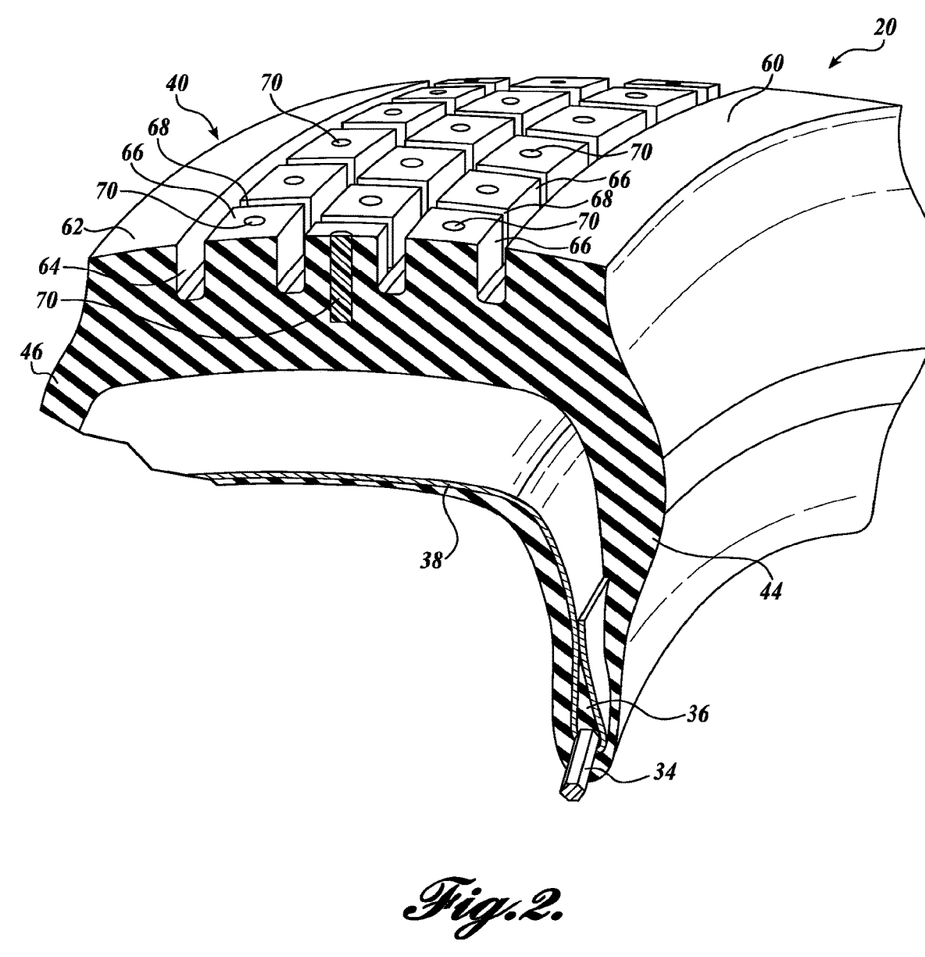
FIG. 2 is a perspective view in partial cross section of the tire shown in FIG. 2.

Turning now to FIGS. 1 and 2, there is shown a tire 20 with a representative embodiment of a tread, generally designated 24, formed in accordance with an aspect of the present disclosure. The tread 24 may be positioned onto a carcass 28. The carcass 28 may include a pair of first and second annular beads 34 and a pair of apexes 36 positioned radially above the first and second annular beads 34. The carcass 28 may include one or more plies 38 that may extend around the beads 34. The carcass 28 may further define a crown region 40 and a pair of sidewalls 44, 46. The carcass 28 may include other components, such as an inner liner 50, and optional belt structure (not shown).

The tread 24 is shown in its cured and finished state in FIGS. 1 and 2. In the embodiment shown, the tread 24 is formed with first and second tread shoulders 60 and 62 extending circumferentially about the tire casing. The tread 24 also includes a number of rows composed of individual tread blocks 66 positioned in between the first and second tread shoulders 60 and 62 and delimited by circumferential grooves 64 and lateral grooves 68. The number of individual tread blocks per row is depicted in FIGS. 1 and 2 as three but other numbers of tread blocks per row can be employed. In other embodiments, the tread 24 may include other structure, such as one or more tire ribs. Each tread block can be independently formed during the tire molding process or the tread blocks can be formed via siping after tire vulcanization, among other techniques. Generally, each tread block 66 is configured to move independent of the other tread blocks 66 of the tread 24.

In accordance with an aspect of the present disclosure, one or more tread blocks 66 include a so-called tire pier 70 comprised of a thermoplastic or polymer (e.g., HDPE; polytetrafluoroethylene (PTFE), polypropylenes, polystyrenes, and combinations thereof) positioned at the approximate center of the respective tread block. The material for each tire pier 70 is selected to be slightly greater (e.g., 0.5%-2.0% greater or more) than the hardness of the rubber composition of the tire. Tire hardness is generally accepted to be up to 70 Shore A. Therefore, in embodiments of the present disclosure, the material hardness of each tire pier 70 is greater than 70 Shore A. In some embodiments, the material hardness of each tire pier 70 is greater than 70 Shore A (e.g., 70.10 Shore A or greater) and have an upper hardness range of about 100 Shore A. In some embodiments, the material hardness can be greater than about 100 Shore A. In some of these embodiments, if the material hardness of the tire pier is greater than 100 Shore A, compensation in the dimensioning of the tire piers (e.g., smaller cross-section area) can be made so that adequate bending of the tread blocks during braking and acceleration still occur.

Generally, the tire piers 70 are configured to be axially strong but laterally and circumferentially weak, causing each tread block with a tire pier to behave anisotropically. In use, that portion of the vehicle load concentrated through the pier is a part of the rubber tread block not compressing, thereby saving some rolling energy which is typically lost in heat in the hysteresis loss of strained rubber.

In some embodiments, solid tire piers can be inserted into holes that are drilled or otherwise formed in respective tire blocks. In other embodiments, suitable material in liquid form can be injected or otherwise introduced into the holes of the tire blocks and left to harden, for example, by curing, etc.

In some embodiments, each tread block 66 of the tread includes a tire pier 70. In other embodiments, the use of the tire piers can vary between rows of tread blocks as the tread extends circumferentially around the tire casing. For example, each row may vary between repeating patterns, such as 2-1-2-1-2, 3-2-3-2-3, 3-2-1-2-3, 3-1-3-1-3, etc. (where rows with 2 piers are located adjacent the tread shoulders). Other tread patterns can also be employed. In some embodiments, more than one tire pier can be disposed within a tread block in random or non-random patterns.

Figure 4A:
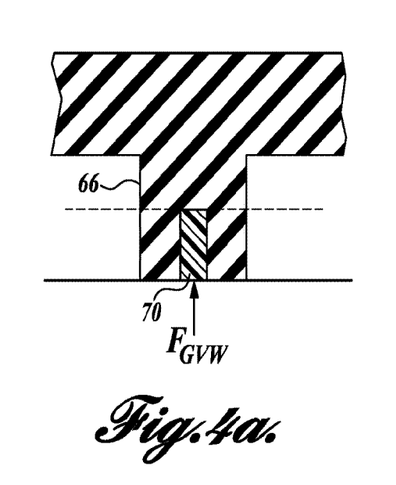
FIGS. 4a and 4b are schematic representations of a portion of another embodiment of a tread of a tire in contact with the ground.
Figure 4B:
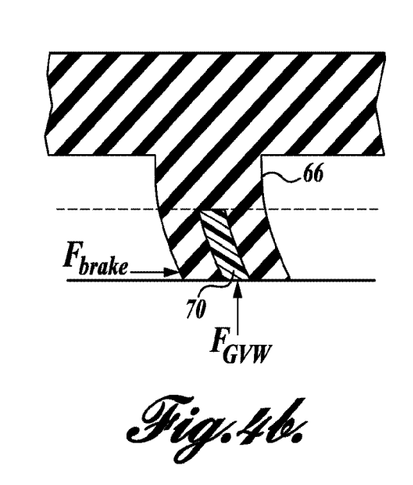

In the embodiment shown in FIGS. 1 and 2, the tire piers 70 extend the entire height of the tread block 66 and partially into the undertread and/or tire casing located below the tread 24. In other embodiments, the tire piers 70 extend partially into the tread blocks 66, such as into a majority of the tread block as shown in FIGS. 4A and 4B, from the undertread or tire casing. In other embodiments, the tire piers 70 can extend into the tread block to any depth. For example, in embodiments of the present disclosure, the tire piers can extend into the tread block up to about 10% of the tread block height, up to about 20% of the tread block height, up to about 30% of the tread block height, up to about 40% of the tread block height, up to about 50% of the tread block height, up to about 60% of the tread block height, up to about 70% of the tread block height; up to about 80% of the tread block height, up to about 90% of the tread block height, and up to about 100% of the tread block height. In some embodiments, the tire piers can extend into the tread block between about 25% and about 75% of the tread height.

The tire piers 70 in some embodiments are generally cylindrical or rod-like in shape, although other elongate forms with different cross-sectional geometries may be employed. The cross-sectional area of the tire piers 70 is determined in conjunction with at least the elasticity of the material chosen so that the tire pier reliable bends during braking and acceleration. For example, the harder the tire pier material is the smaller in cross-sectional area (e.g., diameter) of the tire pier should be to possess the same bending stiffness. Various optimization methodologies can be employed for determining the material/cross sectional area relationship. In some embodiments, one or more of the tire piers have a cross-sectional area in the range of about 0.0380 $in^2$ to about 0.0800 $in^2$. In some embodiments, one or more of the tier piers are cylindrical having a diameter in the range of 0.0125 inches to about 0.0250 inches.

Figure 5:
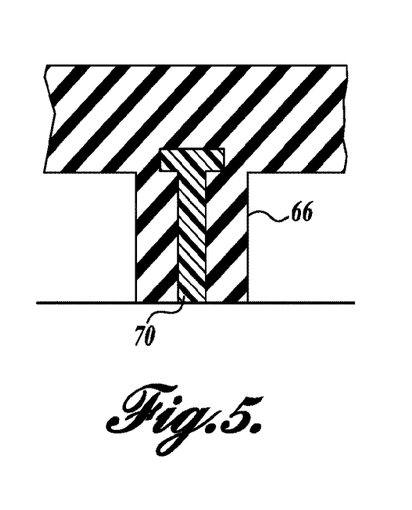
FIGS. 5-8 depict other representative embodiments of a tire pier in accordance with one or more aspects of the present disclosure.
Figure 6:
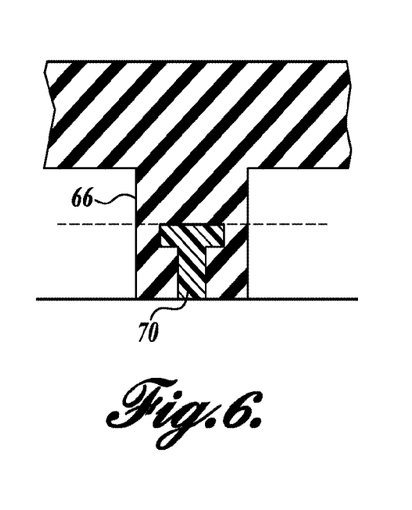
Figure 7:
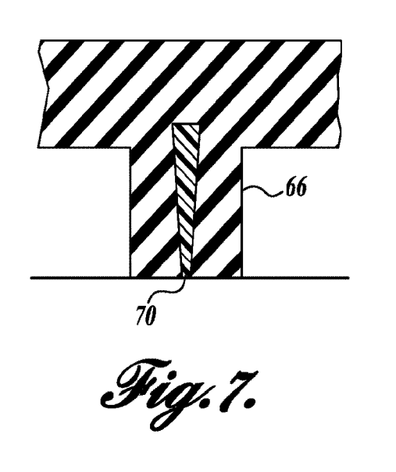
Figure 8:
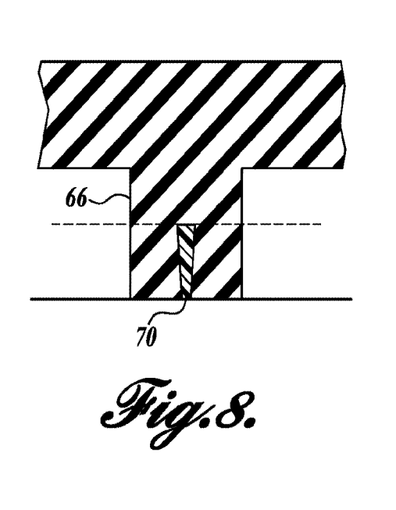

FIGS. 5 and 6 illustrate other embodiments of the tire piers 70 having an inverted "T" shape (i.e., the cross bar of the T is positioned toward the inner part of the tread block) in order to both distribute the pier point loading over a greater area of the tire carcass and to positively retain the tire pier when inserted into or cured in place in cured tire. Alternatively, the tire piers 70 can have a cone shape or other tapering cross sectional geometry in lieu of a T shape (with the base of the cone or tapering geometry being positioned toward the inner part or base of the tread block), as shown in the embodiments of FIGS. 7 and 8. In some embodiments, the tire piers are truncated in shape (e.g., frusto-conical, frusto-polygonal, etc.).

Figure 3A:
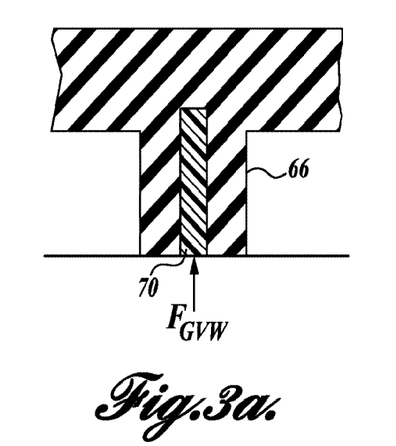
FIGS. 3a and 3b are schematic representations of a portion of the tread of the tire of FIG. 1 in contact with the ground.

FIG. 3a is a schematic representation of a portion of the tread in which a tire block with a tire pier contacts the ground, the tire is stationary and under a normal load. As shown in FIG. 3a, with the force of the weight of the vehicle applied axially to the tread block 66, the presence of the tire pier 70 concentrates a portion of the tire block axial loading from the ground to the tire carcass reducing overall tire block axial strain.

Figure 3B:
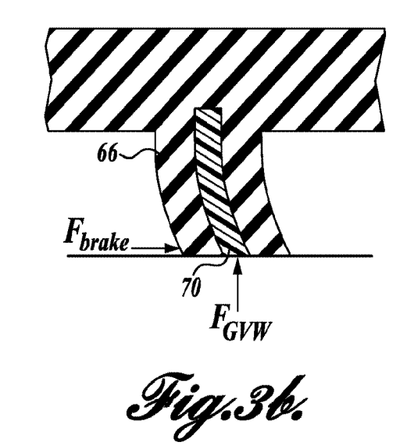

FIG. 3b is a schematic representation of a portion of the tread in which a tire block with a tire pier contacts the ground and the tire is experiences a braking force. As shown in FIG. 3b, with the force of the weight of the vehicle applied axially to the tread block 66 and the braking force applied parallel to the ground, the presence of the tire pier 70 causes no effect due to the inability of the pier column to transfer axial load in its bent (or buckled) state. In this case, vehicle braking ability is not affected. Similar results occur in the presence of motive traction forces.

In some embodiments, the piers 70 extend into the tread blocks to a position coincident with a plane that represents the height of the tread block after about 50% of the tire's tread life has expired, as shown in FIGS. 4a and 4b. It will be appreciated that this "mid-life" tread height (shown as a dotted line in FIGS. 4a and 4b) will differ with different tire compounds as well as different tire uses (e.g., intercity, intracity, all season, traction, etc.). In these embodiments, the piers provide the benefits of axial stiffness until the tread block wears down over the life of the tire. Once the tire reaches about its "mid-life" tread height, the reduced height of the tread block in conjunction with the tread block rubber compound will provide sufficient axially stiffness to provide reduced rolling resistance, etc.

One skilled in the art would understand that embodiments of the tread may find suitable use on tires with tire structure different than that set forth above with regards to FIGS. 1 and 2. Accordingly, embodiments of the tread disclosed herein are not limited to tire 20 shown in FIGS. 1 and 2. Instead, tires of other constructions may be used as well. For example, a tire with a different carcass, sidewalls, etc., may be employed with embodiments of the tread disclosed herein. The tire may include any arrangement of belt structure, plys, etc. Embodiments of the tread may find use on radial ply tires and bias ply tries alike.

Figure 9:
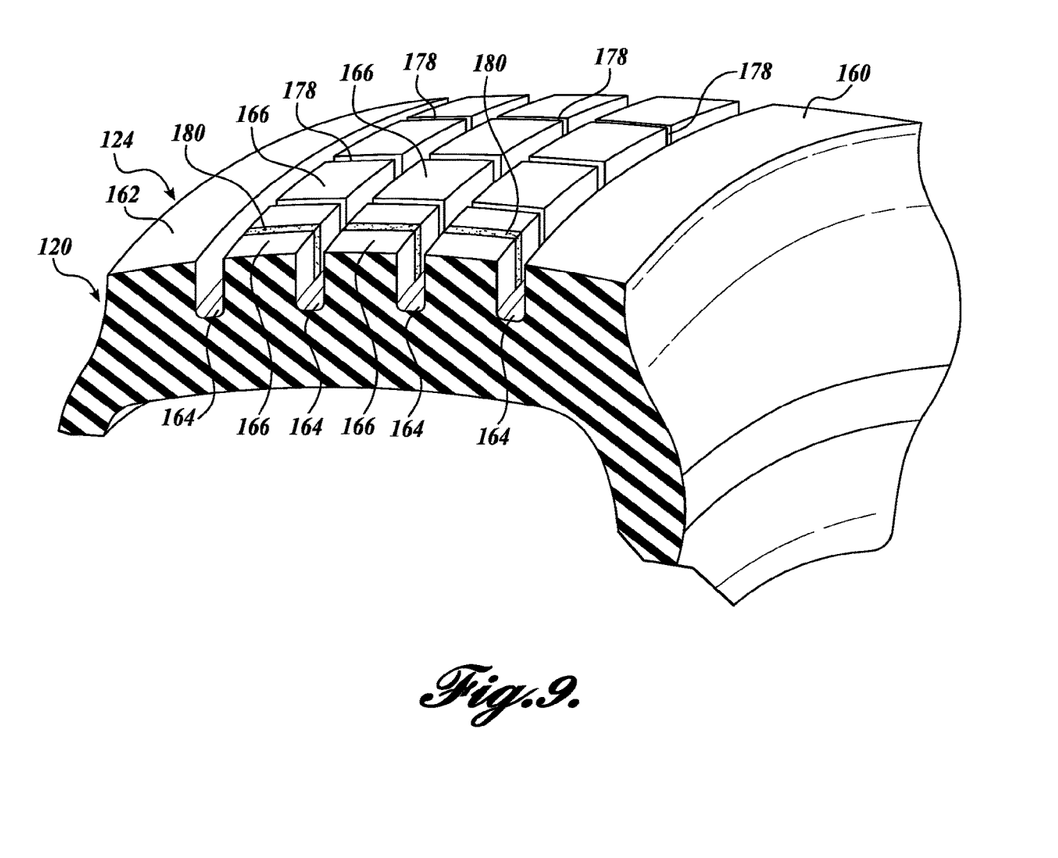
FIG. 9 is a perspective view in partial cross section of another embodiment of a tire in accordance with one or more aspects of the present disclosure.

FIG. 9 depicts another representative embodiment of a tire, generally designated 120, that includes a tread 124 that exhibits anisotropic behavior. As shown in FIG. 9, the tread 124 of the tire 120 is comprised of circumferentially extending first and second shoulders 160 and 162 and a number of tread blocks 166 disposed in between the first and second shoulders 160 and 162. The tread blocks 166 are delimited by circumferential grooves 164 and lateral grooves 178.

Figure 10:
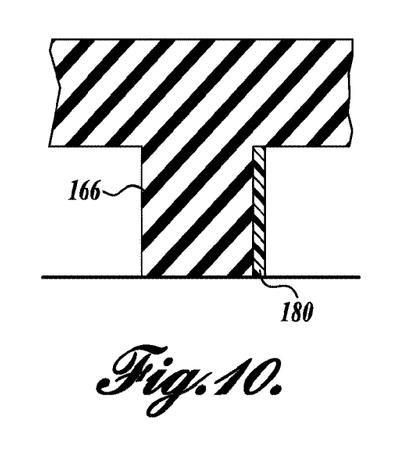
FIG. 10 depict another representative embodiment of a plate stiffener in accordance with one or more aspects of the present disclosure.

Still referring to FIG. 9, the tread 124 further includes means for stiffening the tread blocks while allowing normal lateral (tangential) or circumferential strain for normal braking and motive traction. In some embodiments, such stiffening techniques or stiffening means includes one or more plate stiffeners 180, also generally referred to as sheet piers. In some embodiments, the plate stiffener 180 is disposed laterally along the tread block. In some of these embodiments, the plate stiffener 180 extends from the inner edge to outer edge of the tread blocks, or portions thereof. In some of these embodiments and others, the plate stiffener 180 is disposed either along the minor axis of the tread block, as shown in FIG. 9, or along the aft surface (trailing surface when the tire rotates as the associated vehicle moves forwardly) of the tread, as shown in FIG. 10, and bonded thereto. In other embodiments, the plate stiffener 180 is disposed laterally or substantially laterally anywhere between the fore and aft surfaces of the tread block 166.

In some embodiments, the plate stiffeners 180 are mounted into sipes formed into the tread block 166. In some other embodiments, the plate stiffeners 180 are bonded to the aft surface of the tread blocks. The plate stiffeners 180 may be post-cure bonded into or onto the tire block or co-cured in-mold in a dual durometer molding process.

In use, the plate stiffeners 180 diffuse axial gravitation tread block loads by reducing rubber block strain and its associated strain energy loss. The plate stiffeners 180 are thin to allow the tread blocks 164 to slip normally between one another to provide unaffected circumferential strain for normal tire functions.

In some embodiments, the plate stiffeners 180 have a height that is substantially equal to the height of the tread blocks. In other embodiments, the plate stiffeners have a height that is less than the height of the tread blocks. Similar to the piers described above, the plate stiffeners 180 have a stiffness or hardness value that is greater than the stiffness or hardness value of the tread blocks. In some embodiments, the plate stiffeners 180 include a plastics or polymeric materials, such as high density polyethylene (HDPE), polytetrafluoroethylene (PTFE), polypropylene, polystyrene, and combinations thereof. In some embodiments, the plate stiffeners 180 are constructed of a material or materials having a material hardness value in the range of the tire piers discuss above. Of course, the thickness of the plate stiffeners 180 can be altered in conjunction with material selection. In some embodiments, the thickness of the plate stiffeners 180 is between about 0.0625 inches to about 0.0250 inches, although other thicknesses can be practiced with embodiments of the present disclosure.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about," "approximately," "substantially," "near" etc., means plus or minus 5% of the stated value or condition.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A tire for a vehicle, comprising:
   a body including:
   a first tread shoulder and a second tread shoulder opposite to the first tread shoulder;
   a crown region between the first tread shoulder and the second tread shoulder; and
   a tread block within the crown region, the tread block including a plurality of sidewalls including opposing lateral sidewalls, an end surface extending between distal ends of the plurality of sidewalls, and a lateral dimension extending between the opposing lateral sidewalls of the plurality of sidewalls; and
   a plate stiffening pier in the tread block having a stiffness greater than a stiffness of the tread block to reduce rolling resistance when the vehicle is in operation to improve fuel efficiency of the vehicle, the plate stiffening pier extending through a central region of the tread block and defining distinct fore and aft portions of the tread block separated by the plate stiffening pier, the plate stiffening pier including a distal end surface exposed at the end surface of the tread block and opposing transverse end surfaces exposed at the opposing lateral sidewalls of the plurality of sidewalls of the tread block, the plate stiffening pier having opposing side surfaces that extend between the opposing transverse end surfaces, wherein the plate stiffening pier is solid such that a material of the plate stiffening pier extends uninterrupted in a thickness direction between the opposing side surfaces, and wherein the opposing side surfaces of the plate stiffening pier are in direct contact with the tread block.

2. The tire for the vehicle of claim 1, further comprising:
   a first circumferential groove at one of the opposing lateral sidewalls of the plurality of sidewalls of the tread block; and
   a second circumferential groove at the other one of the opposing lateral sidewalls of the plurality of sidewalls of the tread block, and
   wherein the plate stiffening pier extends from the first circumferential groove to the second circumferential groove, and the tread block is between the first and second circumferential grooves.

3. The tire for the vehicle of claim 2, further comprising:
   a first lateral groove that extends from the first circumferential groove to the second circumferential groove along one of opposing longitudinal sidewalls of the plurality of sidewalls of the tread block, the first lateral groove being transverse to the first and second circumferential grooves;
   a second lateral groove that extends from the first circumferential groove to the second circumferential groove along the other one of the longitudinal sidewalls of the plurality of sidewalls of the tread block, the second lateral groove being transverse to the first and second circumferential grooves, and
   wherein the tread block is between the first and second lateral grooves, and the distinct fore and aft portions of the tread block are located on opposing sides of the plate stiffening pier between the plate stiffening pier and the first and second lateral grooves, respectively.

4. The tire of the vehicle of claim 1, wherein:
   the body further comprises an undertread portion;
   the tread block has a height that extends between the undertread portion and the end surface of the tread block; and
   the plate stiffening pier has a height substantially equal to the height of the tread block, and the plate stiffening pier extends between the end surface of the tread block and the undertread portion.

5. The tire of the vehicle of claim 1, wherein:
   the body further comprises an undertread portion;
   the tread block has a height that extends between the undertread portion and the end surface of the tread block; and
   the plate stiffening pier has a height that is less than the height of the tread block, and the plate stiffening pier extends through the tread block towards the undertread portion.

6. The tire for the vehicle of claim 1, wherein the plate stiffening pier is within a sipe of the tread block.

7. The tire for the vehicle of claim 1, wherein the opposing transverse end surfaces of the stiffening pier are substantially co-planar with the opposing lateral sidewalls of the tread block, and wherein the distal end surface of the stiffening pier is substantially coplanar with the end surface of the tread block.

8. The tire for the vehicle of claim 1, wherein:
the body further comprises an undertread portion;
the tread block extends outward from the undertread portion;
the plate stiffening pier includes a cross-bar portion and a transverse portion transverse to the cross-bar portion, the transverse portion extends between the end surface of the tread block and the cross-bar portion, and the cross-bar portion is located within the undertread portion.

9. The tire for the vehicle of claim 1, wherein:
the body further comprises an undertread portion;
the tread block extends outward from the undertread portion;
the plate stiffening pier includes a cross-bar portion and a transverse portion transverse to the cross-bar portion, the transverse portion extends between the end surface of the tread block and the cross-bar portion, and the cross-bar portion is located within the tread block and is spaced apart from the undertread portion.

10. The tire for the vehicle of claim 1, A tire for a vehicle, comprising:
a body including:
a first tread shoulder and a second tread shoulder opposite to the first tread shoulder;
a crown region between the first tread shoulder and the second tread shoulder; and
a tread block within the crown region, the tread block including a plurality of sidewalls including opposing lateral sidewalls, an end surface extending between distal ends of the plurality of sidewalls, and a lateral dimension extending between the opposing lateral sidewalls of the plurality of sidewalls; and
a plate stiffening pier in the tread block having a stiffness greater than a stiffness of the tread block to reduce rolling resistance when the vehicle is in operation to improve fuel efficiency of the vehicle, the plate stiffening pier extending through a central region of the tread block and defining distinct fore and aft portions of the tread block separated by the plate stiffening pier, the plate stiffening pier including a distal end surface exposed at the end surface of the tread black and opposing transverse end surfaces exposed at the opposing lateral sidewalls of the plurality of sidewalls of the tread block, and wherein the plate stiffening pier has a thickness that ranges from 0.0250-inches to 0.0625-inches.

11. A tire for a vehicle, comprising:
a body including:
a first tread shoulder and a second tread shoulder opposite to the first tread shoulder;
a crown region between the first tread shoulder and the second tread shoulder; and
a tread block including a forward sidewall, a trailing sidewall opposite to the forward sidewall, and opposing transverse sidewalls that extend between the forward sidewall and the trailing sidewall;
a plate stiffening pier in the tread block having a stiffness greater than a stiffness of the tread block to reduce rolling resistance when the vehicle is in operation to improve fuel efficiency of the vehicle, the plate stiffening pier being spaced inwardly from the forward sidewall and the trailing sidewall of the tread block, the plate stiffening pier extending between the opposing transverse sidewalls of the tread block, and wherein the plate stiffening pier has a thickness that ranges from 0.0250-inches to 0.0625-inches.

12. The tire for the vehicle of claim 11, wherein the plate stiffening pier includes a cross-bar portion and a transverse portion transverse to the cross-bar portion, the transverse portion extending between the end surface of the tread block and the cross-bar portion in the body.

13. The tire for the vehicle of claim 11, wherein:
the tread block has a height; and
the stiffening pier has a height that is substantially greater than or equal to the height of the tread block.

14. The tire of the vehicle of claim 11, wherein:
the tread block has a height; and
the stiffening pier has a height that is less than the height of the tread block.

* * * * *

UNITED STATES PATENT AND TRADEMARK OFFICE
CERTIFICATE OF CORRECTION

PATENT NO. : 12,194,781 B2
APPLICATION NO. : 17/485029
DATED : January 14, 2025
INVENTOR(S) : Jeffrey P. Smith Page 1 of 1

It is certified that error appears in the above-identified patent and that said Letters Patent is hereby corrected as shown below:

In the Claims

<u>Column 9, Claim 10, Line 24:</u>
"The tire for the vehicle of claim 1. A tire for a vehicle, comprising:"
Should read:
--A tire for a vehicle, comprising:--.

<u>Column 10, Claim 10, Line 4:</u>
"tread black and opposing"
Should read:
--tread block and opposing--.

Signed and Sealed this
Fifteenth Day of April, 2025

Coke Morgan Stewart
*Acting Director of the United States Patent and Trademark Office*